United States Patent [19]
Wilbs

[11] 4,455,909
[45] Jun. 26, 1984

[54] HACKSAW MACHINE

[76] Inventor: Alfred Wilbs, Wiesenstrasse 5, D-7896 Wutöschingen, Fed. Rep. of Germany

[21] Appl. No.: 463,692

[22] Filed: Feb. 4, 1983

[30] Foreign Application Priority Data

Feb. 13, 1982 [DE] Fed. Rep. of Germany ....... 3205231

[51] Int. Cl.³ .............................................. B23D 45/06
[52] U.S. Cl. ........................................ 83/777; 83/783; 83/662
[58] Field of Search ................. 83/768, 769, 776, 777, 83/783–784, 581.1, 662

[56] References Cited
U.S. PATENT DOCUMENTS
1,856,740  5/1932  Anderson ........................ 83/777 X Primary Examiner—James M. Meister
Attorney, Agent, or Firm—Kuhn, Muller and Bazerman

[57] ABSTRACT

A hacksaw machine comprises an upper and a lower horizontal bracket, a swinging arm in each one of the brackets and a driving mechanism for pivoting the lower swinging arm. A saw-blade connects the front ends of the swinging arms. The lower swinging arm is twice as long as the upper arm. Both swinging arm are tensioned in opposite directions by springs respectively which are adjustably fastened at the brackets. The swinging mechanism is independent on the lengths of the brackets.

10 Claims, 5 Drawing Figures

FIG.2
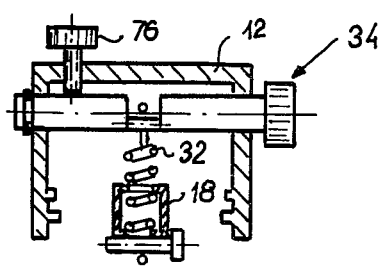
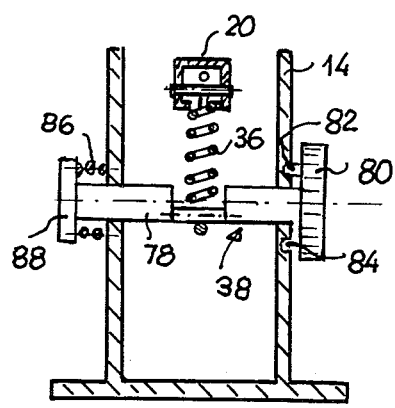
FIG.3

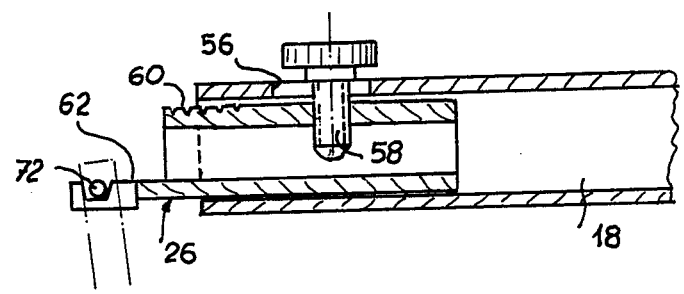
FIG.4
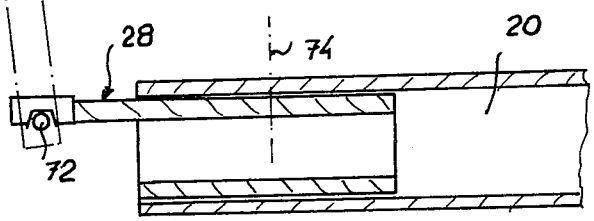
FIG.5
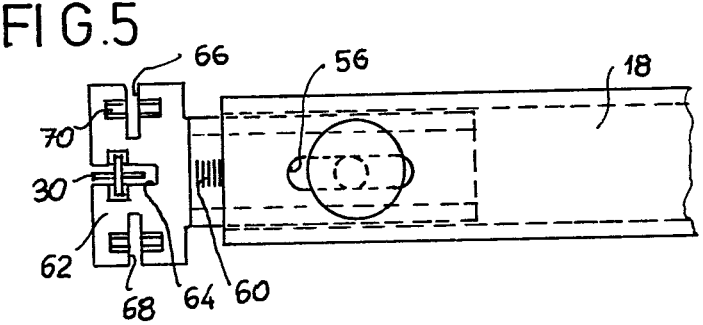

HACKSAW MACHINE

The invention relates to a hacksaw machine comprising a U-shaped frame consisting of a first and a second horizontal bracket spaced one above another and an upright post, a first swinging arm pivotably mounted in the first bracket and a second swinging arm pivotably mounted in the second bracket, an eccentric or cranked shaft driving means connected with the first swinging arm, a saw-blade fastened at the front ends of the first and second swinging arms and spring means engaging with at least one of the first and second swinging arms for tensioning the saw-blade.

In a known hacksaw machine of this type the swinging arms are of equal lengths and the rearward ends of which are connected by a draw spring arranged in a vertical yoke of the frame. Different types of the machine having different lengths of the brackets require special lengths of the swinging arms. The saw-blade is linearly reciprocated.

One object of the invention is to provide a hacksaw machine, in which a one-type swinging arm arrangement can be used for a plurality of frames having different frame lengths.

Another object of the invention is to provide a machine in which the saw-blade is additionally reciprocated in a pendulum-like fashion in order to increase the cutting capacity.

A further object is to counter-balance the swinging arm arrangement of the above-mentioned type although the swinging arms besides of the saw-blade are not connected with one another.

Also one object is to provide such a machine in which the tension of the saw-blade can be adjusted. Last not least it is an object to provide means for adjusting the inclination of the saw-blade.

The main concept of the invention consists in that the swing radius of one of the swinging arms is substantially twice as great as that of the other one and that the spring means comprises a spring one end thereof fastened at the second swinging arm and the other end thereof fastened at the second bracket. Both arms are oppositely inclined.

The drawing shows an example of one embodiment of the invention.

FIG. 2 is a cross-sectional view taken along line 2—2 of FIG. 1;

Figure 1:
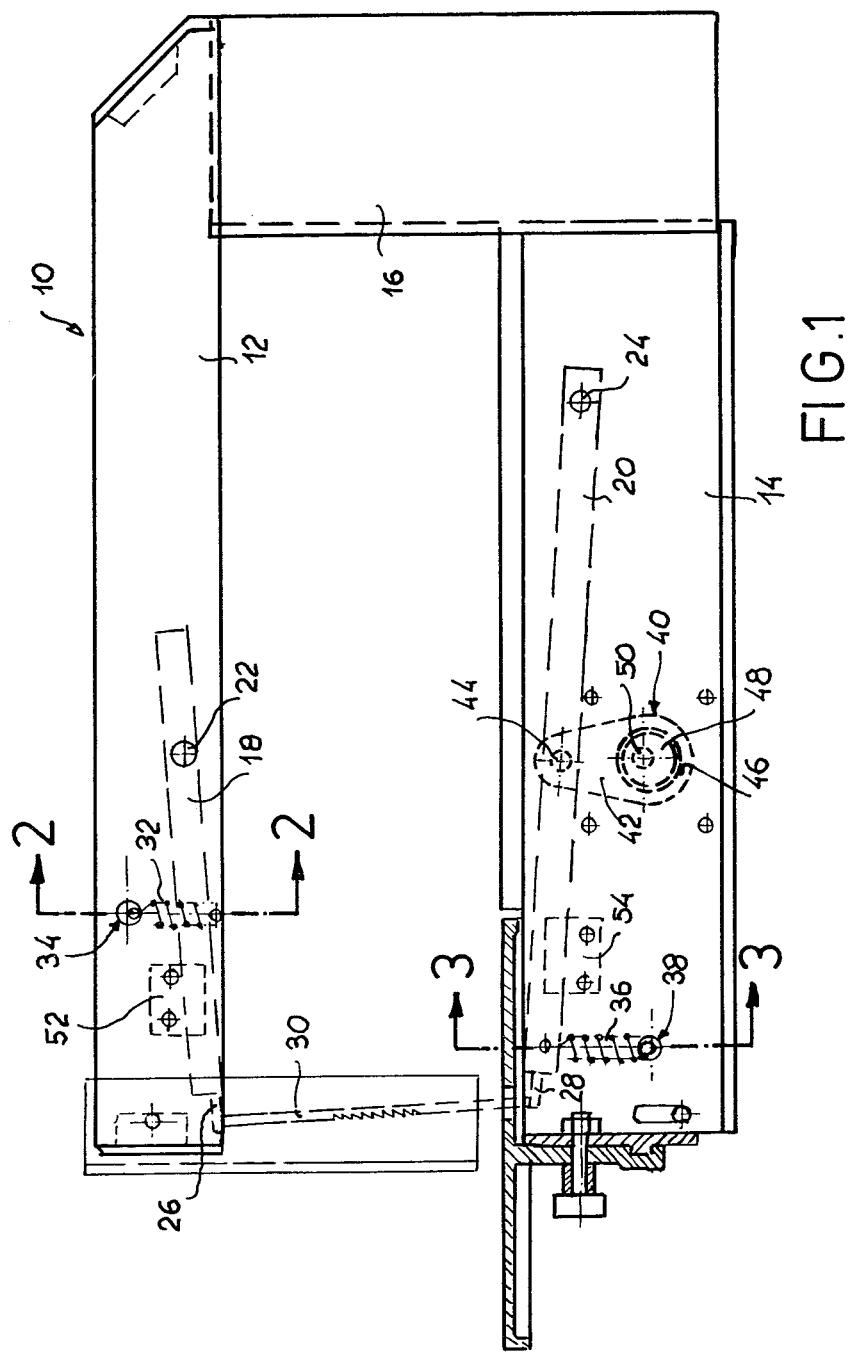
FIG. 1 is a side view of a hacksaw machine.

FIG. 3. is a cross-sectional view taken along line 3—3 of FIG. 1;

FIG. 4 is a longitudinal section of the front end of the saw-blade suspension according to FIG. 1; and FIG. 5 is a plan view of the front end of an upper swinging arm.

A hacksaw machine 10 comprises a first horizontal bracket 14, a second horizontal bracket 12 and an upright post 16 connecting the rearward ends of the brackets 12, 14 to form a U-shaped frame. A first swinging arm 20 is pivotably mounted about an axis 24 in the first bracket 14. A second swinging arm 18 is pivotably mounted about an axis 22 in the upper bracket 12. At the front end of the arms 18,20 projections 26,28 are fastened respectively between which a saw-blade 30 is suspended, with respect to the length of which the positions of the pivot axes 22,24 are chosen to provide that the front end of the upper arm 18 is at a lower level than the axis 22 and the front end of the lower arm 20 is at a higher level than the axis 24. Furthermore the swinging arm 20 is substantially twice as long as the upper arm 18.

The upper arm 18 is urged upwards by a draw spring 32 which hangs at a stretching device 34 mounted on the upper bracket 12. The lower arm 20 is urged downwards by a spring 36 which can be fastened at a crosspin of the lower bracket 14 but in the preferred embodiment is similarly fastened at a stretching device 38.

A driving mechanism 40 comprises a forked connecting rod 42 pivotably suspended in a bearing 44 at the lower swinging arm 20 in a central region thereof. The broadened lower portion of the connecting rod 42 has a bore 46 in which a cylindrical element 48 is rotatably mounted having an eccentric bore 50 into which a shaft of a driving motor (not shown) projects. The cylindrical element 48 is non-rotably fastened on the driving shaft.

When the motor is started the swinging arms 18,20 are reciprocated up and down and are guided by guide elements 52,54 respectively. Because of the opposite inclinations of the swinging arms and thanks to the much longer swing radius of the lower arm 20 as compared with that of the upper arm 18 a pendulum-like horizontal movement of the saw-blade is gained in addition to the vertical reciprocation thereof. That means that during the downward-working-stroke of the saw blade the forward displacement of the lower end thereof is smaller than the rearward displacement of the upper saw-blade end. Furthermore the saw-blade 30 is inclined such that the lower end thereof lies behind the vertical line of the upper end. Thereby a much higher cutting capacity is gained, the necessary driving force is reduced and the saw-dust can be carried off better.

The springs 32,36 are pre-loaded to provide a saw-blade tension. The size of the springs 32,36 and their engagement positions at the arms 18,20 are chosen to provide that the quotients of the turning moment and the effective length of the lever arm of both swinging arms 18, 20 are substantially equal. Therefore the swinging arm mechanism 18,20 is counterbalanced and a low driving force of the motor is sufficient to operate the saw machine even with the saw-blade remarkably tensioned.

As seen in FIG. 4 the inclination of the saw-blade can be adjusted. The upper projection 26 is displaceably guided in the tubular upper swinging arm 18. A clamping thread bolt 58 extends through a slot 56 in the upper wall of the arm 18 and is threaded in a thread hole of the projection 26. A scale 60 indicates the respective inclination of the saw-blade.

Each projection 26, 28 has a front plate 62 provided with three slots 64, 66, 68, into which the saw-blade can be alternatively inserted. The slot 64 lies in the central vertical longitudinal plane of the swinging arm and opens at the front side of the plate 62. The slots 66 and 68 extend rectangularly to slot 64 and open at the opposite side faces of plate 62. Each slot has a cross-wise extending recess 70. The recesses 70 of the upper projection 26 are formed in the upper side of the plate 62 and the recesses 70 of the lower projection 28 are formed at the bottom side. The recesses serve to receive crosspins 72 of the saw-blade as shown in FIG. 4. Thanks to the three-slot-arrangement of each plate 62 it can be sawn not only in longitudinal direction but also from left to right and vice versa.

FIGS. 2 and 3 show the upper and lower stretching devices 34, 38 in greater detail. According to FIG. 3 a shaft 78 mounted for rotation in the lower bracket 14 has an eccentric pin at which the spring 36 is fastened. The spring 36 is shown in high-loaded position. The shaft 78 is locked by a projection 82 formed at the inner face of a knob 80 and which engages into a hole 84. A plurality of such holes are provided at the outer surface of the bracket wall with the same radius. The shaft can be moved axially out of the locking position against the force of a spring 86 which is supported by an end flange 88 of the shaft.

FIG. 2 shows the upper stretching device 34 in its low-loaded position. The locking device is modified. It consists of a clamping thread bolt 76 preventing the shaft from being rotated by the effect of the eccentrical spring force. The shaft in FIG. 2 is not displaceable in axial direction.

I claim:

1. A hacksaw machine comprising a U-shaped frame consisting of a first and a second horizontal bracket spaced one above another and an upright post, a first swinging arm pivotably mounted in the first bracket and a second swinging arm pivotably mounted in the second bracket, an eccentric or cranked shaft driving means connected with the first swinging arm, a saw-blade fastened at the front ends of the first and second swinging arms and spring means engaging with at least one of the first and second swinging arms for tensioning the saw-blade characterized in that the swing radius of one of the swinging arms is substantially twice as great as that of the other one and that the spring means comprises a spring one end thereof fastened at the second swinging arm and the other end thereof fastened at the second bracket.

2. A hacksaw as claimed in claim 1, wherein the shorter swinging arm is mounted in the upper bracket and the front end of which is at a lower level than the privot axis whereas the front end of the lower swinging arm is at a higher level than the pivot axis thereof.

3. A hacksaw as claimed in claim 1, wherein the spring is connected with an adjustable stretching device mounted in the second bracket.

4. A hacksaw as claimed in claim 1, wherein a second spring is mounted between the first bracket and the first swinging arm, said pair of springs acting in opposite directions.

5. A hacksaw as claimed in claim 4, wherein the second spring is connected with an adjustable stretching device mounted in the first bracket.

6. A hacksaw as claimed in claim 3, wherein the stretching device consists of a shaft mounted for rotation in the second bracket, the shaft axis being parallel with the pivot axis of the swinging arms, an eccentric pin arranged at the shaft, the spring being a draw spring suspended on the pin and wherein a locking device is provided for holding the shaft in each adjusted position thereof.

7. A hacksaw as claimed in claim 4, wherein the turning moments applied on to the swinging arms by the springs respectively are oppositely directed and the ratio thereof is directly proportional to the ratio of the effective lengths of the swinging arms.

8. A hacksaw as claimed in claim 1, wherein a projection is fastened at the front end of each one of the swinging arms and is provided with a plate projecting outwards from the swinging arm, wherein at least one vertical slot for insertion of the saw-blade is provided in the plate and wherein the projection of one of the swinging arms is longitudinally adjustable with respect to the swinging arm and is provided with an indicating scale.

9. A hacksaw as claimed in claim 8, wherein each plate is provided with three vertical slots, one of which being arranged in the vertical longitudinal central plane of the swinging arm and opening at the frontside of the plate and the remaining slots opening at opposite sides of the plate and extending rectangularly to the frontside slot.

10. A hacksaw as claimed in claim 8, wherein the projection of the upper swinging arm is adjustably arranged and wherein a clamping thread bolt protruding through a longitudinal slot provided in one of the walls of the swinging arm is threaded into a thread hole of the rearward portion of the projection, the rearward portion being slidingly fitted in the upper swinging arm.

* * * * *